US008887295B2

(12) United States Patent
Rosenan et al.

(10) Patent No.: US 8,887,295 B2
(45) Date of Patent: Nov. 11, 2014

(54) METHOD AND SYSTEM FOR ENABLING ENTERPRISES TO USE DETACHABLE MEMORY DEVICES THAT CONTAIN DATA AND EXECUTABLE FILES IN CONTROLLED AND SECURE WAY

(75) Inventors: Avner Rosenan, Tel-Aviv (IL); Zvi Gutterman, Jerusalem (IL); Gil Sever, Rosh-Haayin (IL)

(73) Assignee: Safend Ltd., Tel Aviv (IL)

( * ) Notice: Subject to any disclaimer, the term of this patent is extended or adjusted under 35 U.S.C. 154(b) by 1776 days.

(21) Appl. No.: 11/424,775

(22) Filed: Jun. 16, 2006

(65) Prior Publication Data

US 2006/0294105 A1 Dec. 28, 2006

Related U.S. Application Data

(60) Provisional application No. 60/595,357, filed on Jun. 27, 2005.

(51) Int. Cl.
| | | |
|---|---|---|
| *G06F 17/00* | (2006.01) | |
| *G06F 7/04* | (2006.01) | |
| *G06F 15/16* | (2006.01) | |
| *G06F 17/30* | (2006.01) | |
| *H04L 29/06* | (2006.01) | |
| *H04N 7/16* | (2011.01) | |
| *G06F 9/445* | (2006.01) | |
| *G06F 21/78* | (2013.01) | |

(52) U.S. Cl.
CPC .......... *G06F 17/30067* (2013.01); *G06F 9/445* (2013.01); *G06F 9/44584* (2013.01); *G06F 21/78* (2013.01)
USPC ..................... 726/27; 726/1; 726/4

(58) Field of Classification Search
CPC ............. G06Q 20/341; G06Q 20/3574; G07F 7/1008; G06F 2221/2141; G06F 21/77; G06F 21/62; G06F 21/6209; G06F 21/6218; G06F 21/6236; G06F 21/00; G06F 9/44584
USPC ...................... 726/1, 17, 21, 26–30; 713/193; 711/163–164
See application file for complete search history.

(56) References Cited

U.S. PATENT DOCUMENTS

| | | | | |
|---|---|---|---|---|
| 5,857,021 A | * | 1/1999 | Kataoka et al. | 705/54 |
| 5,918,008 A | * | 6/1999 | Togawa et al. | 726/24 |

(Continued)

FOREIGN PATENT DOCUMENTS

| | | |
|---|---|---|
| WO | WO 2005/054973 | 6/2005 |
| WO | WO 2006/070353 | 7/2006 |

OTHER PUBLICATIONS

BeCrypt Limited: BeCrypt launches Connect Protect to help enterprises clamp down on growing security risks from portable USB devices; Connect Protect prevents malicious use of mobile computing devices to leak corporate data and introduce viruses, Sep. 29, 2004, M2 Presswire, pp. 1-4.*

*Primary Examiner* — Philip Chea
*Assistant Examiner* — Trong Nguyen
(74) *Attorney, Agent, or Firm* — Pearl Cohen Zedek Latzer Baratz LLP

(57) ABSTRACT

Secure operation of SEMDs on a client computer in a host system is obtained by controlling what applications (i.e., U3 applications) that can run on the host system and access data on the SEMD. Applications allowed to run on each host machine are identified and any access to the SEMD by an allowed application is permitted and other access are prohibited. Security and/or privacy for data that is stored on a SEMD is provided by only allowing approved USB memory card based applications to access the data stored on the SEMD. All other applications, either unapproved USB memory card based applications or non-SEMD resident cannot access the data on the SEMD. Other security is provided by preventing access to the SEMD except for computers or systems that are a part of a company's private network and maintaining the data on the SEMD in an encrypted state.

22 Claims, 7 Drawing Sheets

(56) References Cited

U.S. PATENT DOCUMENTS

| | | | |
|---|---|---|---|
| 6,282,612 B1* | 8/2001 | Sakajiri et al. | 711/115 |
| 2002/0078367 A1* | 6/2002 | Lang et al. | 713/200 |
| 2002/0099944 A1* | 7/2002 | Bowlin | 713/185 |
| 2002/0176575 A1* | 11/2002 | Qawami et al. | 380/201 |
| 2003/0023954 A1* | 1/2003 | Wilkinson et al. | 717/118 |
| 2004/0010656 A1* | 1/2004 | Chiao et al. | 711/103 |
| 2004/0010701 A1* | 1/2004 | Umebayashi et al. | 713/193 |
| 2006/0143716 A1* | 6/2006 | Ikemoto | 726/27 |
| 2006/0150247 A1* | 7/2006 | Gafken | 726/17 |
| 2006/0288166 A1* | 12/2006 | Smith et al. | 711/115 |

* cited by examiner

METHOD AND SYSTEM FOR ENABLING ENTERPRISES TO USE DETACHABLE MEMORY DEVICES THAT CONTAIN DATA AND EXECUTABLE FILES IN CONTROLLED AND SECURE WAY

CROSS-REFERENCE TO RELATED APPLICATIONS

This patent application is a U.S. non-provisional application filed pursuant to Title 35, United States Code §100 et seq. and 37 C.F.R. Section 1.53(b) claiming priority under Title 35, United States Code §119(e) to U.S. provisional application No. 60/595,357 filed Jun. 27, 2005 naming Avner Rosenan, Zvi Gutterman and Gil Sever as the inventors, which application is herein incorporated by reference. Both the subject application and its provisional application have been or are under obligation to be assigned to the same entity.

BACKGROUND

Introduction

The description of the various aspects and embodiments of the present invention relates to detachable memory devices that contain both executable files and data and that are intended to be used by enterprises. If you have ever been to a DISNEY theme park, there is no doubt that you found yourself crowded into the little fiberglass boat, floating on rather peculiar blue water, through a series of animated creatures representing several nationalities across the globe, all singing the catchy little tune "It's a Small World After All". Well, as technology continues to advance, not only is our world growing smaller, but the majority of the technology devices we use on a day-to-day basis are also growing smaller. It was not all that long ago that a system administrator could stand in awe of the 3 gigabyte drive system installed on his main frame computer—even though the drive system was the size of a standard refrigerator! Today, kids are walking around with 60 gigabyte iPods in their shirt pockets. You can not argue against the facts—things are getting smaller.

Desktop computers gave way to luggable computers, which led to laptop computers, notebook computers and now even hand-sized computers. But even with all this shrinkage, there is still a need and a desire to be able to travel without having to take your computer with you—regardless of its size. There are many reasons for this need in the art. An obvious reason is that every time you take your computer around with you, you run the risk of damaging the computer, losing the computer or becoming a victim of a theft. Yet, there is still a need in the art to enable a user to have access to his or her computing environment, data, applications, or the like when they are outside of their home or office environment.

One technique that has been introduced to address this problem depends on the use of the Internet and technologies such as VPN, PC ANYWHERE, XP Remote Desktop, etc. Such solutions allow a user to actually gain access to his or her home computing environment while they are at a remote location. The user simply needs to gain access to an Internet enabled computer. This technique has some disadvantages. One disadvantage is that the computers available to the user may have access restriction, especially with regards to accessing other systems over the Internet. Thus, the existence of filters, firewalls, etc. may restrict the usefulness of this solution. Another technique to address this problem takes advantage of the ever shrinking size of memory devices. This technique utilizes USB based memory devices that can be used to store data, applications, environments, frameworks, or the like. Using this technology, a user can plug his or her USB memory card into a USB equipped computer and thereby gain access to the information stored on the USB memory device. The frameworks that are installed in the USB memory device are adapted to run applications that are associated with one or more configuration files or data that are stored in the USB memory device. For example, the framework application may be a launch pad application. Such a feature converts the USB memory device into a smart external memory device (SEMD). The applications that are controlled by the frameworks can be stored in the SEMD or in another internal or external storage device, such as but not limited to an hard-disk that is associated with the computer. Several SEMD products are currently available on the market, such as but not limited to U3, Iomega Active Disk, and the X-KEY devices.

In general, the SEMDs are flash drives with a USB interface. More specifically, and as described on the U3 website at www.u3.com, U3 devices are flash drive based USB devices that can contain zero or more U3 based applications. A U3 application is software application that is tuned to run from a U3 device. While the U3 application is running, the U3 application has access to most of the host computer's resources, such as but not limited to the volume of the device, the system's registry, the network adapters, etc. . . . The U3 platform, as well as similar solutions, provides several advantages. First of all, it provides an elegant solution for application mobility. With such technology, software applications are not tied to a single machine. Rather, the software can run off any appropriately equipped and configured device without installation on the host computer. In addition, most software applications can be converted into a mobile application with minimal developer effort and without application coding or recoding.

As an example to further the reader's understanding, a typical application cycle based on the U3 technology is described as consisting of the following stages:

1. Device installation—the U3 application is installed onto the USB flash memory device.

2. Host installation—the U3 application is installed onto a specific host after the device is plugged into the host.

3. Start application—the U3 application starts running from the host.

4. Stop application—the U3 application stops running from the host.

5. Host uninstall—the U3 application should delete all its traces from the host machine once the device is removed from the host or while being ejected.

6. Device uninstall—the U3 application is deleted from the device.

Thus, the reader should appreciate that the SEMDs provide an elegant solution to the above-identified needs in the art; however, it should be understood that such devices also have significant security issues, both for enterprises and for private consumers. These security issues include, but are not limited to, the following security concerns.

1. The SEMDs, in essence, appear as an unsecured storage volume once installed into a host system. As such, every application of the host computer can access can access the data that is stored on the SEMD. This characteristic of the SEMDs actually raises two concerns. First of all, enterprises may be concerned that confidential information may be written to the SEMD and thus, result in data leakage. In addition, the enterprise may be concerned about the introduction of unfiltered data and applications into the organization's network.

2. The SEMDs are a convenient tool for housing large volumes of data, such as documents, mail and appointments.

If a device being used as such is lost or falls in the wrong hands, all this data is compromised.

3. Because the network is generally a core element for the operation of most enterprises, an enterprises may want to control the applications that are run on their systems. Thus, the use of SEMDs may introduce unwanted applications and problems into the system.

4. An enterprise may decide that the use of SEMDs is acceptable for the system. However, the administration may decide that only company issued SEMDs can be utilized within the system. However, such a capability does not currently exist in the industry and as such, once the ability to utilize the SEMDs is enabled, users are able to purchase their own SEMDs and utilize them in the enterprise's system.

5. Finally, an enterprise may simply want to control the SEMDs that run on their system but again, presently a solution to restrict this does not exist.

Therefore, there is a need in the art for a security solution that will handle all the major security concerns that the SEMDs introduce and thus, further promote the advantages of using such devices.

BRIEF SUMMARY

The present invention addresses the above-listed needs in the art, as well as other needs that will be appreciated by those skilled in the art by providing a solution that enables secure operation of SEMDs. One aspect of the present invention enables a system administrator to control what applications (i.e., U3 applications) that can run on the host system. More particularly, this aspect of the present invention enables a system administrator to identify which applications are allowed to run on each host machine that is governed by the system administrator. Another aspect of the present invention operates to provide security and/or privacy for data that is stored on a SEMD. This aspect of the present invention enables only approved USB memory card based applications to access the data stored on the SEMD. All other applications, either unapproved USB memory card based applications or non-SEMD resident cannot access the data on the SEMD. Two other aspects of the present invention are also focused on protecting the security of information stored on a SEMD. One aspect of the invention operates to prevent access to the SEMD except for computers or systems that are a part of a company's private network. The other aspect of the invention operates to maintain the data on the SEMD in an encrypted state. Advantageously this aspect of the present invention protects the data from being compromised if the SEMD is lost or stolen. These and other aspects, features and embodiments of the present invention are more fully described below.

DETAILED DESCRIPTION OF THE INVENTION

Turning now to the figures in which like numerals represent like elements throughout the several views, exemplary embodiments, and various aspects and features of the present invention are described. For convenience, only some elements of the same group may be labeled with numerals. The drawings are designed to describe exemplary embodiments of the present invention and not for production or limitation. Therefore, features shown in the figures are chosen for convenience and clarity of presentation only.

Figure 1:
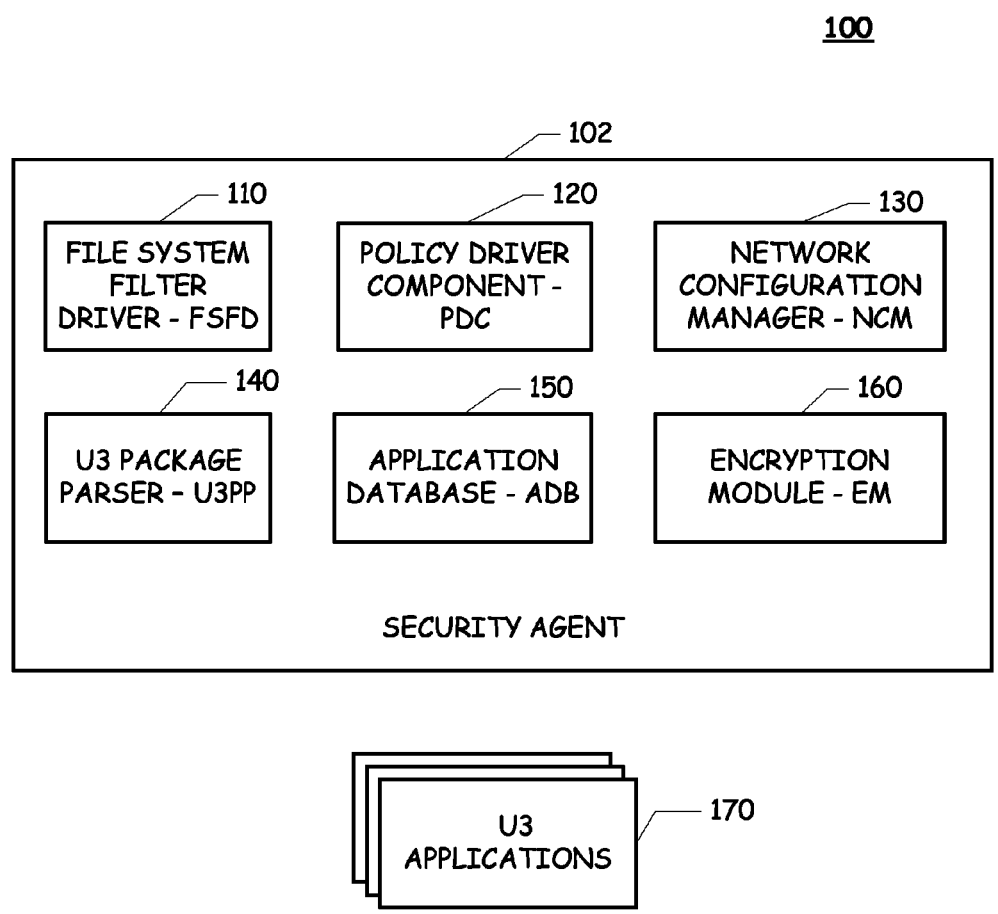
FIG. 1 is a block diagram that illustrates relevant modules of a client computer that implements an exemplary security agent.

FIG. 1 is a block diagram illustrating the relevant elements of a computing device 100 that may be used in an enterprise network suitable for various embodiments of the present invention. Exemplary computing device 100 can be such as but not limited to a personal computer, a desktop computer, a laptop computer, a notebook computer, a palm computer, a mobile telephone or a PDA, etc. The term enterprise as used throughout this description refers to any entity that maintains a host or server system and as such, includes large companies, small companies and even personal systems. As such, the present invention may be used by anyone but for purposes of illustration, the application within a typical business setting is being presented. Computing device 100 is running an SEMD and having a security agent 102. For simplification, the present invention is described with reference to the SEMD being a U3 device. However, those skilled in the art will appreciate that the present invention is not limited to use with U3 devices but rather, that U3 devices are simply a non-limiting example. Thus, the present invention may also be used in conjunction with X-Key devices or any other similar type device. In addition, it should also be appreciated that although the present invention is described in terms of a memory device with a USB interface, other communication interfaces may also be used instead of a USB interface. Also, the present invention is described as employing flash memory devices, this again is a non-limiting example in that other memory device technology may also be used in conjunction with the present invention.

In general, the enterprise provides a hosts system that includes one or more client computers that are communicatively connected or that can be communicatively connected to the host system through various techniques. A typical client computer 100 may include a security agent comprising the following components: a File System Filter Driver (FSFD) 110, a Policy Driver Component (PDC) 120, a Network Configuration Manager (NCM) 130, a U3 Package Parser (U3PP) 140, an Application Database 150 and an encryption module (EM) 160. During running the U3 device, computing device 100 may run zero or more U3 applications 170. More information on an exemplary security agent can be found in a PCT application number PCT/IL 2005/001367 and in a PCT application number PCT/IL 2004/001073, the contents of which are incorporated herein by reference.

An exemplary security agent 102 can be stored on the SEMD and can be deployed to the computing device 100 during the plug-in of the SEMD. In alternate embodiments of the present invention, security agent 102 may reside on the computing device itself and can be stored in its hard-disk, for example.

Thus, the illustrated system shows a system that can provide protection and security, in accordance with the present invention, for smart USB storage devices, such as, but not limited to, U3 or XKey devices. In this application, the terms "smart external memory device (SEMD)", "smart USB storage devices" and "smart USB memory device" may be used interchangeably. The FSFD 110 operates to monitor all activities on file access and file enumeration made in the client computer. In an exemplary embodiment of the present invention, the FSFD 110 has a significant role in enforcing the enterprise's policy and giving access only to allowed portions of the smart USB storage device's storage volume. Exemplary FSFD 110 can be a kernel mode module that filters all access to the volume of the U3 device and can check which process has requested access to the volume. The ADB 150 is a database that includes the identification of all of the approved U3 applications 170 that are running. The ADB 150 can be queried by the FSFD to identify the approved U3 applications 170 that are running.

A U3 Package may contain one or more executable files. When authorizing the U3 Package (as described above) the FSFD 110 calls the U3 Package Parser. The U3PP 140 then enters all the executables identified by the FSFD 110 query to the ADB 150 into the U3 Package The Policy Driver Component 120 contains the policy definitions and rules established by the enterprise and can be queried by the FSFD 110 or by other components within the system. Exemplary PDC 120 can be a driver that has all the policy information about approved U3 applications 170. Once a policy is defined for a host system, the policy is encrypted and maintained in an encrypted state. Furthermore, the policy can be signed. This feature provides enhanced security to prevent others from replacing the policy with a less restrictive or bullet proof policy. The PDC 120 is accessible by the FSFD 110 for various queries regarding policy allowances and restrictions. The PDC 120 also interfaces to the NCM 130 from which it can receive policy changes enacted by the NCM 130.

The Network Configuration Manager 130 is a network component handling all policy issues. It operates to organize the policy around the enterprise's network. The main objective of the Network Configuration Manager 130 is to keep the PDC 120 up-to-date with the policy associated with the particular client computer The NCM 130 can provide information to the system administrator to indicate all the U3 applications 170 available on a U3 device. This information is provided in a U3 Package. When a U3 Package is approved by the system administrator, the NCM 130 uses a cryptographic hash function on the U3 Package and stores the result of this function in the policy information sent to the different PDCs 120 in the enterprise.

The U3PP 140 is a software component that is used by both the security agent 102 and the server. The U3PP 140 is used to parse a smart device's application package to make a determination as to what applications may be run by the SEMD and what files are contained within its memory.

The Application Database 150 is a component which, in an exemplary embodiment of the present invention, may contain all of the executable files located in all approved U3 applications. The EM 160 is a module that operates to encrypt the content of a disk or a storage volume. The U3 applications 170 can be extracted from the SEMD and run from the host computer 100. In this application, the terms "host computer", "computing device" and "client computer" may be used interchangeably.

An exemplary embodiment of the present invention may include a software component that can operate to filter file system actions that are related to SEMD applications, which are not authorized. Such a software program may implement algorithms such as the ones illustrated in FIGS. 2,3, and 4. The computer device 100 may include a security agent 102 that was previously installed. The installation can be done via a server that belongs to an organization. The security agent can comprise components such as but not limited to, a File System Filter Driver (FSFD) 110, a Policy Driver Component (PDC) 120 and a Network Configuration Manager (NCM) 130.

Figure 2:
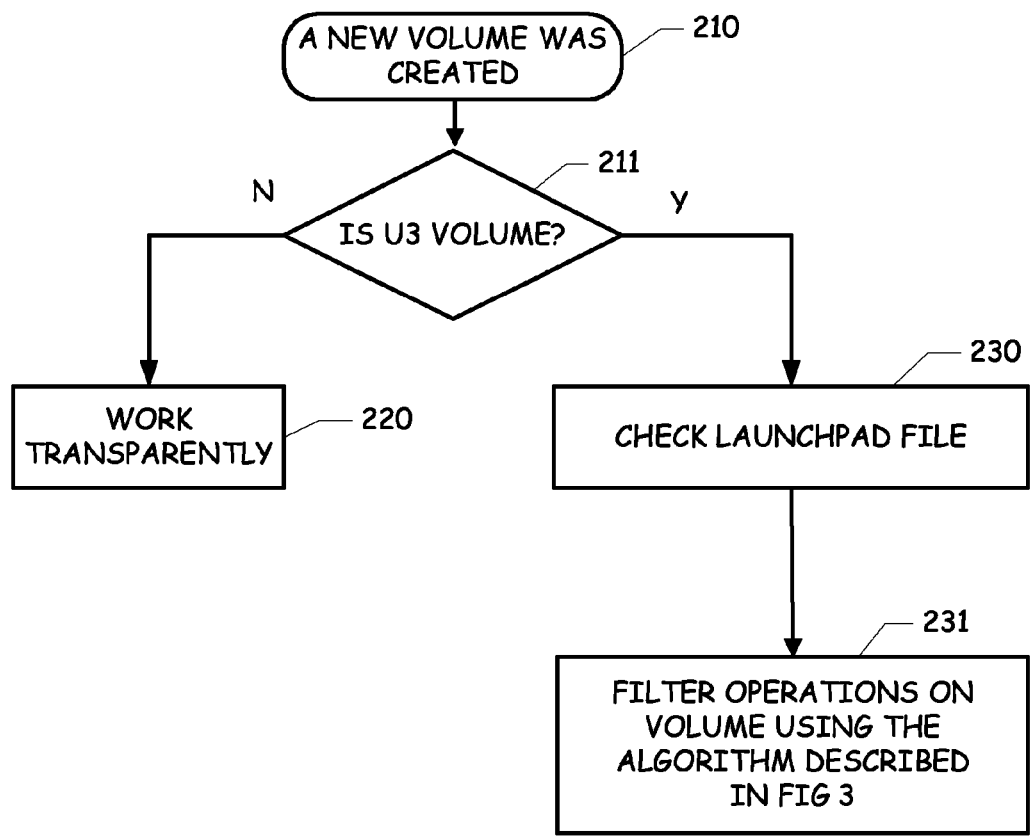
FIG. 2 is a flowchart diagram that illustrates an exemplary software algorithm for controlling SEMD applications.

FIG. 2 is a flowchart diagram that illustrates an exemplary software algorithm for controlling SEMD applications. The steps illustrated in FIG. 2 represent the actions taken by the FSFD 110 when encountering a new volume or when a SEMD is connected to a client computer 100.

The illustrated process 210 is invoked when an SEMD is attached to a client computer resulting in the creation of a new volume accessible by the client computer. The FSFD 110 operates to determine whether the new volume is a U3 volume 211. If the new volume is not a U3 volume, the FSFD 110 works transparently 220, and does not effect the operation of the host the system. However, if the volume has the attributes of a U3 device, the FSFD 110 checks to determine if the launch pad version in the U3 device is valid and that the U3 device has all the access privileges necessary for operation 230. Then, the FSFD 110 takes certain actions, based on the information that was retrieved in step 230, to filter operations on the new volume 231 as it is depicted below in conjunction with FIGS. 3 and 4.

Figure 3:
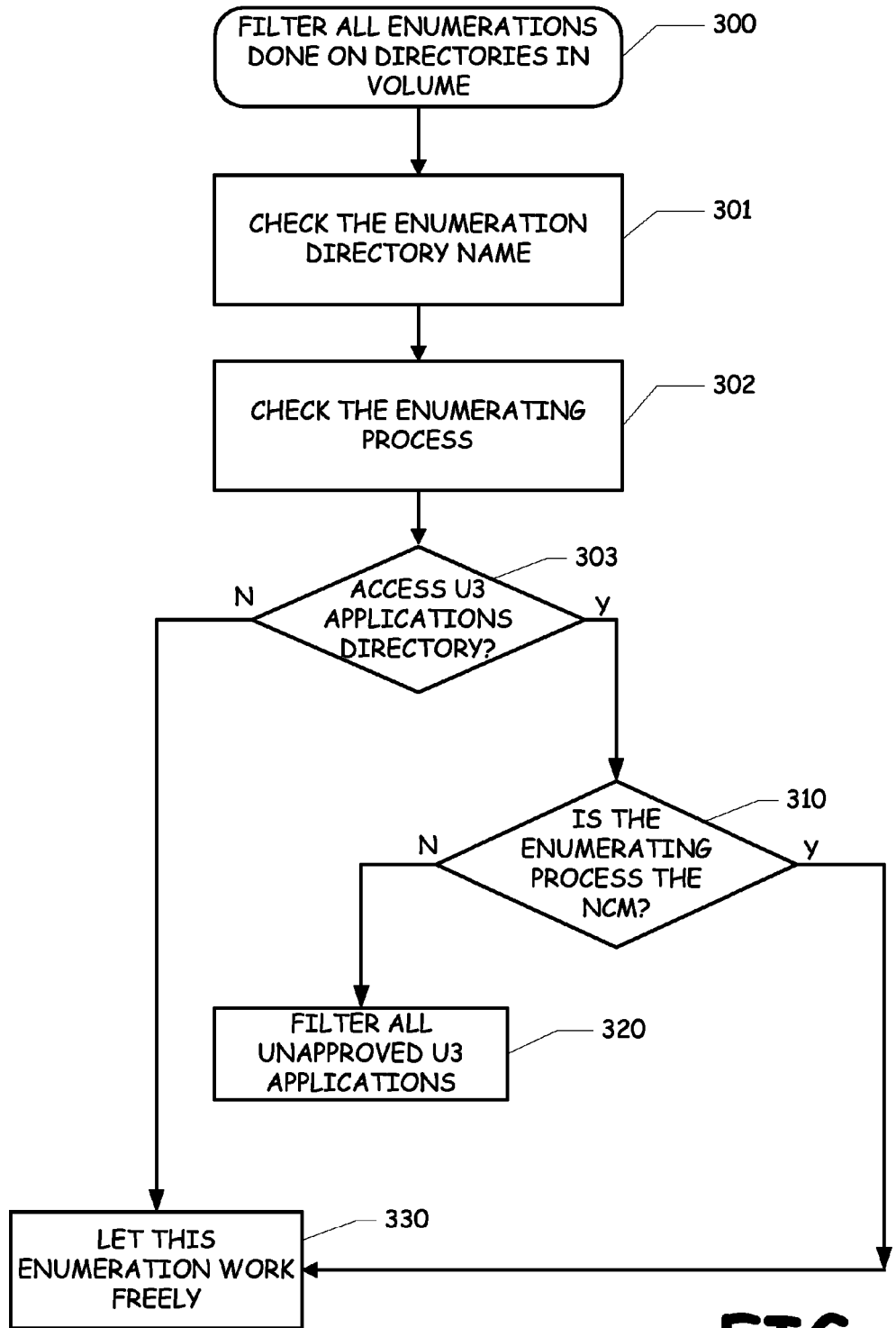
FIG. 3 is a flowchart diagram illustrating the filtering actions taken by an exemplary software algorithm for controlling a SEMD when an enumeration is performed.

FIG. 3 is a flowchart diagram illustrating the filtering actions taken by an exemplary software algorithm for controlling a SEMD when an enumeration is performed, such as but not limited to accessing a data file, invoking an application, creating a data file, etc. The steps illustrated in FIG. 3 represent the actions taken by and FSFD 110 to filter all enumerations done on directories in volume as shown by 300. Thus, for every file enumeration performed on a U3 volume, some or all of the steps illustrated in FIG. 3 are performed. Initially, the process operates to extract the directory name from the enumeration request 301. Next the process operates to extract the enumerating process's attributes (i.e., the unique identification of the process) 302. The process then continues by checking whether the enumerated directory is the U3 applications directory 303. If the enumerated directory is not in the U3 applications directory, then the enumeration is allowed to proceed freely without further intervention 330 (Note, the enumeration might still be filtered by the FSFD 110 as more fully described in the following sections). If the enumerated directory is the U3 applications directory, the process continues by checking 310 if the enumerating process is the NCM 130. If the enumerated process is the NCM 130, the enumeration is allowed to work transparently 330. However, if the enumerated process is not the NCM 130, then the process continues at step 320 by checking every file/directory containing a U3 application 170. During this step, if the process determines that the file/directory is not a U3 application's file/directory, then the process will not filter it. However, if the file/directory is a U3 application, the process operates to access the file/directory, and validate the content of the file or the directory. An exemplary validation process can be done by calculating a hash value of the content of this file/directory. Note, the hash function used in this process can be any secured hash function, such as but not limited to SHA-1, SHA-256, MD5. If the hash value is approved by the PDC 120, then the process will not operate to filter this file/directory. However, if, the hash value is not in a white list (or pre-approved list) in the PDC 120, then the illustrated embodiment of the present invention operates to filter this enumeration and will not pass this file/directory. The enumerated application (which may be the U3 launch pad) will not be aware of the existence of the U3 application 170 that was blocked by the FSFD 110.

Figure 4:
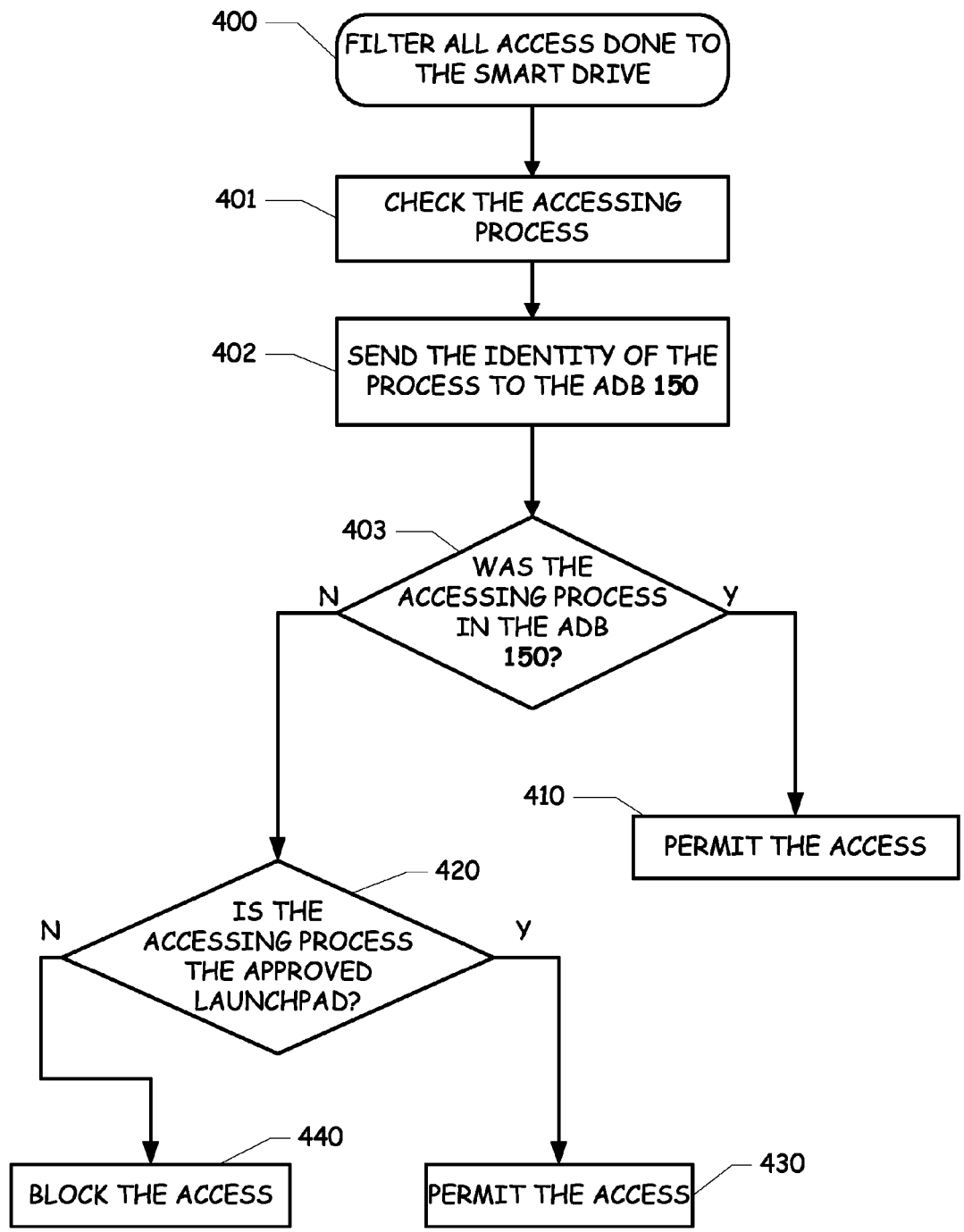
FIG. 4 is a flowchart diagram illustrating an exemplary algorithm of the actions taken by the FSFD 110 when an attempt to access the file system of a U3 device is made.

FIG. 4 is a flowchart diagram illustrating an exemplary algorithm of the actions taken by the FSFD 110 when an attempt to access the file system of a U3 device is made. All access attempts to the file system (especially opening handles for files or directories) is monitored (step 400) by the FSFD 110. Each access is checked for to identify what process is performing the attempted access 401. The identity of the process is sent to the ADB 150 at step 402 and then the ADB 150 performs a query to determine if the process is in its approved applications database 403. If the accessing process is in the approved applications database, then the application performing the access is identified as a U3 smart application that is approved. The attempted access is then approved at step 410. Another exemplary embodiment of the present invention may limit the grant of this access to special directories, files, folders, applications, or the like, that are allowable for this application to access.

However, if the accessing process is not in the approved applications database, then the ADB 150 will determine if the accessing process is the approved launch pad 420. If the accessing process is the approved launch pad, then the access is permitted at step 430. Otherwise, the accessing process is blocked at step 440.

Securing the U3 device against access in an unauthorized host.

One or more of the exemplary embodiments of the present invention may include the process of encrypting the content of the U3 device at the disk level. In such an embodiment, the process of reading and writing to the U3 device may be possible only if the accessing process has the encryption key to that device.

The encryption key of a device may be a random key that is unique to that device. When a client computer that is inside the enterprise's network encounters a U3 device, it checks the unique ID of the U3 device. In one exemplary embodiment of the present invention, the encryption of the U3 device's data may be based on a one way function that uses the unique ID of the U3 device and an enterprise secret seed to generate an encryption key that will be used to encrypt the content of the U3 device. Once encrypted, it would exceedingly difficult for a hacker to read the files on the U3 device and hence, to use the U3 device on a computer outside the enterpise's network.

In yet another embodiment of the present invention, a key server may be utilized. The key server operates to provide a random key to every U3 device stores the random key in a manner that is associated with the U3 device. When a client computer encounters a U3 device for the first time, it tries to connect to the server and to obtain the encryption key. The server operates to authenticate the client device and verify that it is a valid client device and is operating normally or as expected. If the server determines that the client computer is valid and operating normally, it provides the key to the client computer. Once the client computer receives the key, the U3 device can then be used on this client computer.

Figure 5:
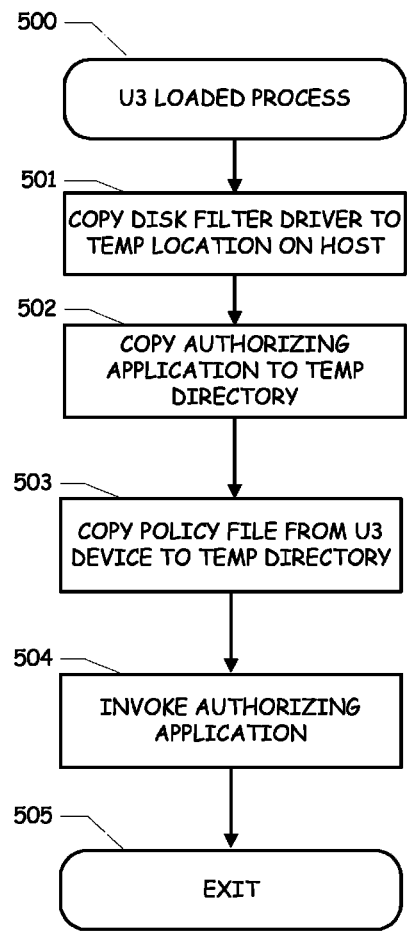
FIG. 5 is a flowchart diagram illustrating another exemplary embodiment of the present invention that includes a U3 device resident process. In this embodiment, a process is loaded into the U3 device and invoked.
Figure 6:
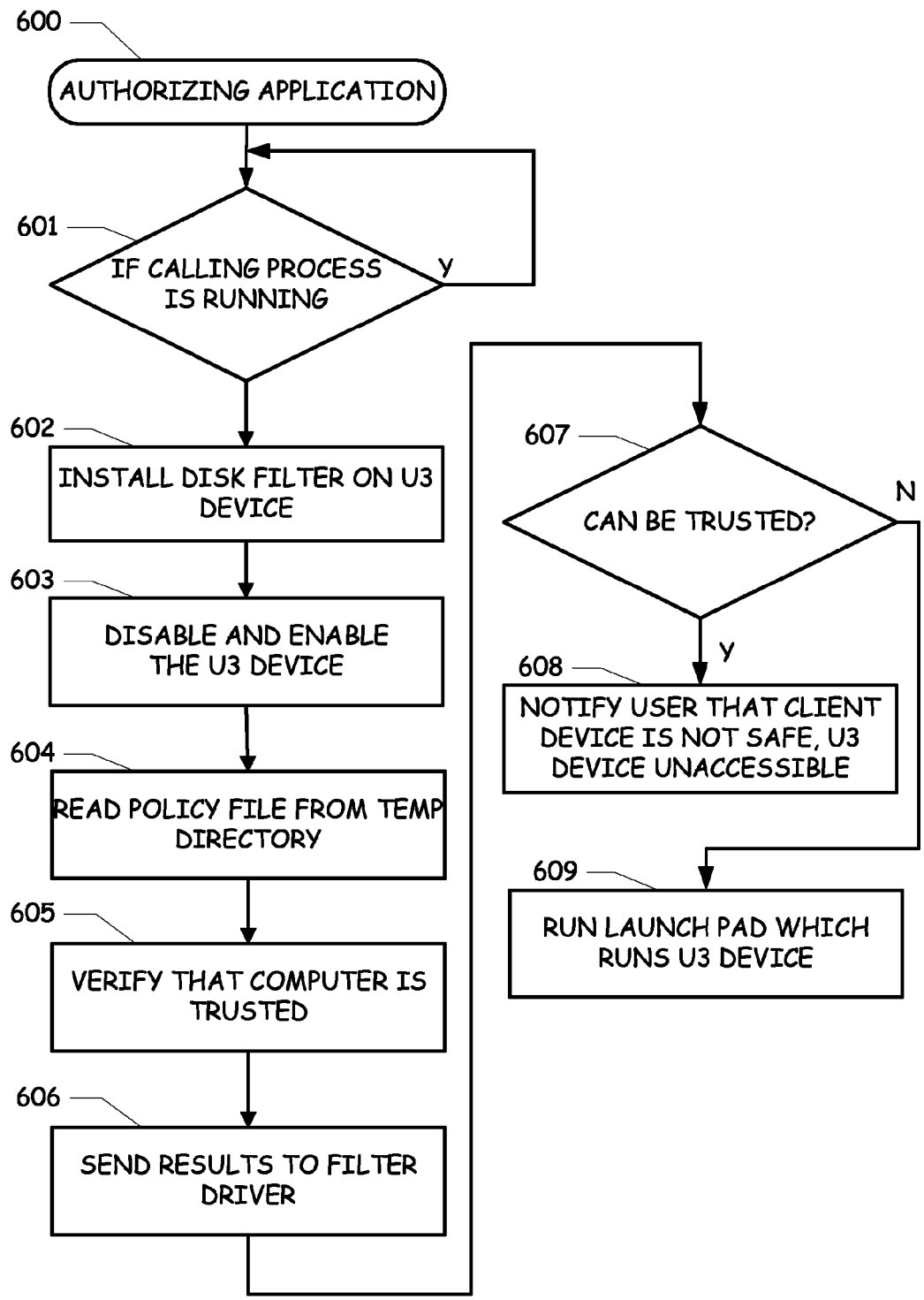
FIG. 6 is a flowchart diagram illustrating the operation of an embodiment of the authorizing application invoked in the flowchart of FIG. 5.

FIG. 5 is a flowchart diagram illustrating another process (a loading process) that can be used by exemplary embodiment of the present invention to load a U3 device resident application. The loading process is stored in memory section of the SEMD that emulates a read only memory (a CDROM for example). In this embodiment, the loading process is loaded from the U3 device to a program memory of the computing device 100 (FIG. 1) and is invoked. This process runs prior to the launch-pad of the U3 device. The U3 loading process 500 initially copies a disk filter driver from the SEMD to a temporary directory located on the host machine 501. The temporary directory should be configured in a manner that it is cleared or erased upon the restart of the system. Next, an authorizing application 600, which is illustrated in FIG. 6), is copied to a temporary directory 502. The policy file on the U3 device is then identified and copied to the temporary directory 503. Finally, the authorizing application 550 is then invoked asynchronously from the temporary directory 504. Once the process has invoked the authorizing application 600, the process is exited 505.

FIG. 6 is a flowchart diagram illustrating the operation of an embodiment of the authorizing application invoked in the flowchart of FIG. 5. The authorizing application 600 initially enters a wait loop 601 where it resides until the calling process 500 is exited. Once the calling process 500 is exited, the authorizing application 600 installs the disk filter from the temporary directory on the host device on to the U3 device stack in the host memory 602. The authoring application 600 then disables the U3 device and then re-enables it 603. This process causes the disk filter to become active. The authorizing application 600 proceeds by reading the policy file from the temporary location on the host machine 604 and then uses this information to determine if the client computer is authorized 605. This determination is made, at least in part, by checking whether all the critical applications are running properly (such applications may include a hardware firewall, a networking firewall and antivirus application). The authorizing application 600 check also can include conducting digital file signature verifications to further confirm that the security applications have not been tampered with. Furthermore, the authorizing application 600 will check the integrity of certain registry settings that are included in every client computer in every enterprise. These registry settings are functional to identify the enterprise to which the client computer is connected. The parameters may include the DNS suffix, IP addresses or special parameters that are left for this purpose alone (such as a unique enterprise id that is a GUID).

The authorizing application 600 continues by sending the results of the determination made in step 605 to the filter driver 606. The message sent to the filter driver may include, but is not limited to, an IOCTL (IO control) message. If the client computer is determined to not be a trusted system 607, such as if the enterprise information is not validated successfully, the authorizing application 600 notifies the user that the U3 device will not be accessible because the client computer is not safe 608. However, if the client computer is determined to be trusted, the launch pad application is invoked, which in turn invokes the U3 device 609.

Figure 7:
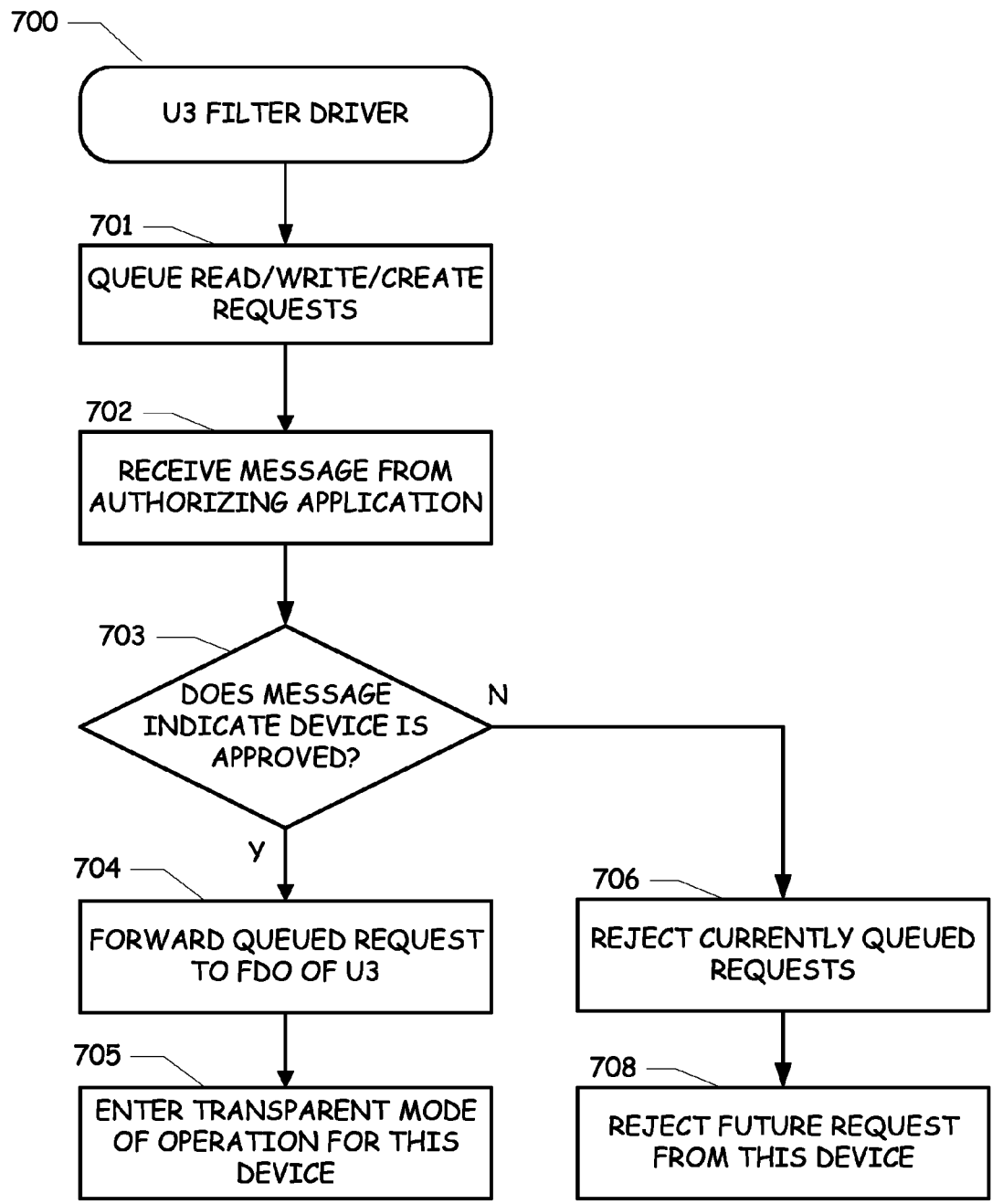
FIG. 7 is a flowchart diagram illustrating the operations taken by an exemplary filter loaded into the U3 memory device.

FIG. 7 is a flowchart diagram illustrating the operations taken by an exemplary filter loaded from the U3 memory device. Once the filter driver is loaded into the U3 memory device driver stack in the host computer, the filter algorithm 700 operates to control or limit access to the U3 memory device by queuing (delaying) each read, write and create request 701. These requests are queued rather than being sent to the function device object (FDO) driver that is controlling access to and operation of the U3 memory device. At some point, the filter receives 702 a message that was sent during step 605 (FIG. 6) by the authorizing application. If the message from the authorizing application 600 (FIG. 6) indicates that the accessing device, such as the client computer attempting to access the U3 memory device, is approved or trusted 703, then the queued read, write and create requests are then forwarded to the FDO of the U3 memory device 704. In addition, the filter enters into a transparent mode of operation 705 for that accessing device thereby allowing all future requests from that accessing device to be directed to the FDO of the U3 memory device. However, if 703 the message indicates that the accessing device is not approved or not trusted, the filter operates to reject the requests currently pending in the queue 706, as well as any additional requests received 708 from that accessing device.

As previously mentioned, one aspect of exemplary embodiment of the present invention includes encrypting the contents of the storage volumes of the U3 memory device. Encryption of the storage volumes of a U3 device can advantageously limit access to the content of the U3 device from outside the organization or from anyone not having the requisite decryption capabilities. This aspect of the present invention enables the U3 memory device to operate as a proper and secure extension of the enterprises storage space. An exemplary embodiment of an encryption process that can be utilized to implement this aspect of the present invention is described above in the section on securing the U3 device against access in an unauthorized host.

In the description and claims of the present disclosure, each of the verbs, "comprise", "include", "have", and conjugates thereof, are used to indicate that the object or objects of the verb are not necessarily a complete listing of members, components, elements or parts of the subject or subjects of the verb.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The described embodiments comprise different features, not all of which are required in all embodiments of the invention. Some embodiments of the present invention utilize only some of the features or possible combinations of the features. Different combinations of features noted in the described embodiments will occur to persons skilled in the art. The scope of the invention is limited only by the following claims.

What is claimed is:

1. A method for enhancing security of a network containing a plurality of client computers and a host system, wherein at least one of the client computers is configured to be detachably connected to a smart external memory device containing one or more applications, the method comprising the steps of:
   detecting that a detachable smart external memory device is connected to a client computer included in said plurality of client computers;
   based upon said detecting that the smart external memory device is connected to the client computer, determining whether the client computer is authorized using a policy temporarily stored on the client computer prior to running an approved framework application of the smart external memory device, if the client computer is authorized, then the approved framework application runs the smart external memory device; locating at least one application stored on said smart external memory device and determining whether said application is included in a list of approved applications configured to be executed in conjunction with said smart external memory device; and
   if said application is included in said list, then allowing said approved application to access only specific folders or files on said smart external memory device, said specific folders or files being associated with said approved application, and, if said application is not included in said list, determining whether said application is the approved framework application of the smart external memory device, and if the application is the approved framework application, then permitting the access to the specific folders or files; and if said application is not the approved framework application of the smart external memory device, then preventing said application from accessing data on the smart external memory device.

2. The method of claim 1, wherein the client computer is a device selected from a list of devices consisting of: a personal computer, a desktop computer, a laptop computer, a notebook computer, a palm computer, a mobile telephone or a PDA.

3. The method of claim 1 further comprising the step of entering an approved application into the list of approved applications based on a digitally signed package.

4. The method of claim 1 further comprising the step of entering an approved application into the list of approved applications based on a white list of cryptographic hash values.

5. The method of claim 1, the method comprising the steps of:
   storing an authorizing application on the smart external memory device that will execute prior to a framework application; and
   executing the authorizing application when the smart external memory device is connected to a client computer included in the plurality of client computers, the authorizing application operating to:
   validate that the client computer to which the smart external memory device is attached is part of a private network prior to starting the framework application.

6. The method of claim 5, further comprising the step of preventing any operations with the smart external memory device if the client computer is not validated as part of the private network.

7. The method of claim 5, wherein the smart external memory device is a U3 device.

8. The method of claim 7, wherein the framework application is a launch pad application.

9. The method of claim 1, comprising the steps of:
   creating the policy that defines allowable operations related to the smart external memory device;
   storing the policy on one or more of the client computers;
   storing a file system filter driver on one or more of the client computers;
   detecting a connection of the smart external memory device to one or more of the client computers;
   capturing an attempt to access to the one or more client computers or to the smart external memory device by the file system filter driver; and
   verifying the captured attempted access is allowed in accordance with the policy, prior to allowing the access.

10. The method of claim 9, wherein the policy includes a list of approved applications and respective digital signatures and the attempted access is from an application running on a smart memory device driver stack, and the step of verifying the captured attempted access comprises verifying that the application and respective digital signature are included in the list.

11. The method of claim 9, wherein the step of detecting the connection of the smart external memory device to the one or more of the client computers comprises the steps of:

detecting the connection of a device to one or more of the client computers;

determining a type of the device; and if the device is not a smart external memory device, allowing operations with the connected device without capturing by the file system filter driver, and if the device is a smart external memory device, verifying that the smart external memory device has a valid launch pad program prior to allowing access to the smart external memory device.

12. The method of claim 9, wherein the step of capturing an attempted access to the smart external memory device comprises the steps of:

determining if the access is for a file on the smart external memory device;

determining if the accessing application is identified in the policy;

allowing the access if the file is on the smart external memory device and the application is identified in the policy.

13. The method of claim 9, further comprising the step of filtering the attempted access if the application is not identified in the policy.

14. The method of claim 9, further comprising the step of allowing access if a file system to which access is attempted is not related to the smart external memory device.

15. The method of claim 9, wherein verifying the captured attempted access is allowed comprises performing a hash function on the application to produce a result and comparing the result to a value stored in the policy.

16. The method of claim 9, wherein the smart external memory device is a U3 device, and the step of detecting a connection of the smart external memory device to the one or more client computers further comprises detecting a connection of a U3 device.

17. The method of claim 9, wherein the smart external memory device is a USB based smart memory device, and the step of detecting a connection of the smart external memory device to the one or more of the client computers further comprises detecting a connection of a USB based smart memory device.

18. A method for providing security to a private network containing a plurality of client computers when a storage volume on smart external memory device is detachably connected to at least one of the client computers, the method comprising the steps of:

detecting that a detachable smart external memory device is connected to a client computer;

based upon said detecting that the smart external memory device is connected to the client computer, determining whether the client computer is authorized using a policy temporarily stored on the client computer prior to running an approved framework application of the smart external memory device, if the client computer is authorized, then the approved framework application runs the smart external memory device;

locating application executables stored on said smart external memory device;

determining whether at least one of said application executables is included in a list of approved application executables configured to be executed in conjunction with said smart external memory device; and if said at least one application executable is included in said list, then enabling said application executable to access only specific folders or files on said smart external memory device, said specific folders or files being associated with said approved at least one application executable and, if said application executable is not included in said list, determining whether said application executable is the approved framework application of the smart external memory device, and if the application executable is the approved framework application, then permitting the access to the specific folders or files; and if said application executable is not the approved framework application of the smart external memory device, then preventing said application executable from accessing data on the smart external memory device.

19. The method of claim 18, wherein at least one of the client computers includes a file system filter driver and the step of enabling access to the smart external memory device is performed by the file system filter driver.

20. The method of claim 19, further comprising the step of encrypting data stored on the smart external memory device and enabling only client computers on the private network to access the data.

21. The method of claim 20, wherein the step of encrypting data stored on the smart external memory device further comprises the steps of:

extracting a unique identification number from the smart external memory device;

executing a one-way hash function using the unique identification number to create a key; and requiring all access to the data on the smart external memory device to utilize a key generated in the one-way hashing step.

22. The method of claim 18, wherein the smart external memory device is a U3 device.

\* \* \* \* \*